UNITED STATES PATENT OFFICE.

CLEAVELAND F. DUNDERDALE, OF NEW YORK, N. Y.

IMPROVEMENT IN HYDRAULIC CEMENTS.

Specification forming part of Letters Patent No. 167,653, dated September 14, 1875; application filed July 16, 1874.

*To all whom it may concern:*

Be it known that I, CLEAVELAND F. DUNDERDALE, of the city, county, and State of New York, have invented a Composition for Making Hydraulic Cement, of which the following is a specification:

The nature of the invention consists in mixing artificially lime, kaolin, (silicate of alumina,) and the mineral or clay known as fuller's-earth, and designated by the following analysis, to wit: Silicic acid, 42 to 58 per cent.; alumina, 10 to 18; magnesia, 1 to 3; lime, 0 to 10; soda and potassa, 0 to 3; oxides of iron, 6 to 12; and carbonic acid, 0 to 15 per cent.

To prepare the cement, take of kaolin or other silicate of alumina and the fuller's-earth in the desired proportions, say, one part by weight of the dry silicate of alumina, and two parts of the dry fuller's-earth, which proportions I find most preferable, to four and a half parts of common quicklime, as free from impurities as possible, or, in lieu thereof, eight parts of the carbonate of lime. Grind and mix them together as thoroughly as possible in a finely-divided state, which can best be done in water by means of what is commonly known as a "wash-mill," in which case the water would have to be removed by allowing the mixture to settle in a tank, and after removing the supernatant water, dry the residue mixture of clays and lime, which is then to be burned in a kiln to the verge of vitrification, and afterward ground in a suitable mill into a fine powder, when it is ready for use.

The object of using a mixture of kaolin or other silicate of alumina and the fuller's-earth is to obtain the proper proportions of the necessary ingredients of silica, alumina, oxides of iron, and magnesia to make a good cement when mixed with the lime, and then burnt and ground.

I am aware that hydraulic cement is made by incorporating a peculiar clay found in certain natural deposits with lime or chalk, then treating the mixture; but my invention differs from this in artificially producing this natural mixture of materials so deposited by an artificial combination of two different clays or minerals, so as to get the same quantity of the different ingredients, which seems to be essential, when mixed with lime, burnt, and ground, to produce a good hydraulic cement.

I do not confine myself to the exact proportions of the different materials named herein.

I claim as my invention—

A composition for making hydraulic cement, consisting of the artificial admixture of kaolin or other silicate of alumina, and the clays or minerals known as fuller's-earth, and designated by the analysis as herein mentioned, with the lime or the carbonate thereof, in the manner and for the purpose as herein set forth.

CLEAVELAND F. DUNDERDALE.

Witnesses:
  GEO. H. FEIL,
  A. P. CURTIN.